(12) United States Patent
Tan et al.

(10) Patent No.: US 12,523,545 B2
(45) Date of Patent: Jan. 13, 2026

(54) SURFACE-ACOUSTIC-WAVE TEMPERATURE AND PRESSURE SENSING DEVICE AND MANUFACTURING METHOD THEREOF

(71) Applicant: North University of China, Taiyuan (CN)

(72) Inventors: Qiulin Tan, Taiyuan (CN); Xiaorui Liang, Taiyuan (CN); Juan Zhang, Taiyuan (CN); Lei Zhang, Taiyuan (CN); Wendong Zhang, Taiyuan (CN); Jijun Xiong, Taiyuan (CN)

(73) Assignee: North University of China, Taiyuan (CN)

( * ) Notice: Subject to any disclaimer, the term of this patent is extended or adjusted under 35 U.S.C. 154(b) by 889 days.

(21) Appl. No.: 17/836,565

(22) Filed: Jun. 9, 2022

(65) Prior Publication Data

US 2023/0146607 A1    May 11, 2023

(30) Foreign Application Priority Data

Nov. 9, 2021   (CN) .......................... 202111303254.7

(51) Int. Cl.
*G01K 11/26*      (2006.01)
*G01D 21/02*      (2006.01)
(Continued)

(52) U.S. Cl.
CPC .......... *G01K 11/265* (2013.01); *G01D 21/02* (2013.01); *G01L 1/165* (2013.01); *G01L 11/04* (2013.01);
(Continued)

(58) Field of Classification Search
CPC ...... G01K 11/265; G01D 21/02; G01L 1/165; G01L 11/04; H03H 9/02574; H03H 9/02834; H03H 9/25
See application file for complete search history.

(56) References Cited

U.S. PATENT DOCUMENTS

2006/0049714 A1 *   3/2006   Liu ....................... G01S 13/755
                                                      310/313 R

FOREIGN PATENT DOCUMENTS

CN        102169036 A   *   8/2011
CN        204439245 U   *   7/2015
(Continued)

OTHER PUBLICATIONS

English translation of CN-204439245-U, accessed via Espacenet.com (Year: 2015).*

(Continued)

*Primary Examiner* — Jeremy A Luks
(74) *Attorney, Agent, or Firm* — Ballard Spahr LLP

(57) ABSTRACT

Disclosed in the present disclosure are a surface-acoustic-wave temperature and pressure sensing device and a manufacturing method thereof. The surface-acoustic-wave temperature and pressure sensing device includes a first high-temperature-resistant substrate and a second high-temperature-resistant substrate bonded together, where a recess is formed in the second high-temperature-resistant substrate to form a sealed cavity between the first high-temperature-resistant substrate and the second high-temperature-resistant substrate; first surface-acoustic-wave temperature sensors and surface-acoustic-wave pressure sensors are formed on a first surface of the first high-temperature-resistant substrate located in the cavity, and second surface-acoustic-wave temperature sensors are formed on a second surface of the first high-temperature-resistant substrate opposite the first surface; and the first surface-acoustic-wave (Continued)

temperature sensors, the second surface-acoustic-wave temperature sensors, and the surface-acoustic-wave pressure sensors are electrically connected to one another.

13 Claims, 4 Drawing Sheets

(51) Int. Cl.
    *G01L 1/16*           (2006.01)
    *G01L 11/04*         (2006.01)
    *H03H 9/02*          (2006.01)
    *H03H 9/25*          (2006.01)

(52) U.S. Cl.
    CPC .... *H03H 9/02574* (2013.01); *H03H 9/02834* (2013.01); *H03H 9/25* (2013.01)

(56) References Cited

FOREIGN PATENT DOCUMENTS

| | | | | |
|---|---|---|---|---|
| CN | 110006490 A | * | 7/2019 | ......... G01L 19/0092 |
| CN | 111337083 A | * | 6/2020 | ......... G01L 19/0092 |
| CN | 111620299 A | * | 9/2020 | ......... B81C 1/00388 |
| CN | 211877098 U | * | 11/2020 | |
| KR | 20160088111 A | * | 7/2016 | ........... G01N 27/121 |
| WO | WO-2020215611 A1 | * | 10/2020 | ............. G01D 21/02 |

OTHER PUBLICATIONS

English translation of CN-102169036-A accessed via Espacenet.com (Year: 2011).*

English translation of WO-2020215611-A1, accessed via Espacenet.com (Year: 2020).*

\* cited by examiner

SURFACE-ACOUSTIC-WAVE TEMPERATURE AND PRESSURE SENSING DEVICE AND MANUFACTURING METHOD THEREOF

CROSS REFERENCE TO RELATED APPLICATION

This patent application claims priority to Chinese Patent Application No. 202111303254.7, filed on Nov. 9, 2021, the disclosure of which is incorporated by reference herein in its entirety.

TECHNICAL FIELD

The present disclosure relates to the technical field of surface-acoustic-wave devices, and in particular, to a surface-acoustic-wave temperature and pressure sensing device and a manufacturing method thereof.

BACKGROUND

With the development of aerospace engineering, the performance of rocket engines has also been continuously improved, which makes the operating temperatures and pressures of complex components such as engine blades, rotor parts, impellers, and test parts in the engines constantly rise.

During the operation of the components, a high pressure and high heat generated by a gas flowing at a high speed easily cause hardly repairable damage to the components. Therefore, through real-time measurement of the temperatures, pressures and other parameters of the components, the operating intensity of the components can be monitored in real time to reduce the damage rates of the components.

The maximum operating temperature of existing temperature sensors and pressure sensors is 800° C., while the temperature inside the rocket engines can reach more than 1000° C. Therefore, the existing temperature sensors and pressure sensors cannot be applied to the rocket engines, and cannot implement real-time health monitoring for the components, either.

SUMMARY

The present disclosure provides a surface-acoustic-wave temperature and pressure sensing device and a manufacturing method thereof, for solving technical problems existing in the prior art, so as to increase the operating temperatures of temperature and pressure sensors to implement real-time health monitoring for components in a high-temperature environment.

The surface-acoustic-wave temperature and pressure sensing device provided by the present disclosure includes a first high-temperature-resistant substrate and a second high-temperature-resistant substrate bonded together, where a recess is formed in the second high-temperature-resistant substrate to form a sealed cavity between the first high-temperature-resistant substrate and the second high-temperature-resistant substrate; first surface-acoustic-wave temperature sensors and surface-acoustic-wave pressure sensors are formed on a first surface of the first high-temperature-resistant substrate located in the cavity, and second surface-acoustic-wave temperature sensors are formed on a second surface of the first high-temperature-resistant substrate opposite the first surface; and the first surface-acoustic-wave temperature sensors, the second surface-acoustic-wave temperature sensors, and the surface-acoustic-wave pressure sensors are electrically connected to one another.

Furthermore, both the first high-temperature-resistant substrate and the second high-temperature-resistant substrate are made of lanthanum gallium silicate.

Optionally, the surface-acoustic-wave pressure sensors are located in the center of the first surface inside the cavity, and the first surface-acoustic-wave temperature sensors are located on an edge of the first surface inside the cavity.

Furthermore, the second surface-acoustic-wave temperature sensors are opposite the first surface-acoustic-wave temperature sensors.

Optionally, through holes are formed in the first high-temperature-resistant substrate and filled with conductive metals for electrically connecting the second surface-acoustic-wave temperature sensors to the first surface-acoustic-wave temperature sensors and the surface-acoustic-wave pressure sensors.

Furthermore, the surface-acoustic-wave temperature and pressure sensing device further includes protective layers respectively covering the first surface-acoustic-wave temperature sensors, the second surface-acoustic-wave temperature sensors, and the surface-acoustic-wave pressure sensors.

The manufacturing method for the surface-acoustic-wave temperature and pressure sensing device provided by the present disclosure includes: (1) forming a recess in a second high-temperature-resistant substrate; (2) forming first surface-acoustic-wave temperature sensors and surface-acoustic-wave pressure sensors on a first surface of a first high-temperature-resistant substrate; (3) bonding the first high-temperature-resistant substrate and the second high-temperature-resistant substrate to form a sealed cavity therebetween, the first surface-acoustic-wave temperature sensors and the surface-acoustic-wave pressure sensors being located in the sealed cavity; and (4) forming second surface-acoustic-wave temperature sensors on a second surface of the first high-temperature-resistant substrate opposite the first surface.

Optionally, step (2) further includes: forming protective layers respectively on the first surface-acoustic-wave temperature sensors and the surface-acoustic-wave pressure sensors.

Optionally, step (4) further includes: forming protective layers respectively on the second surface-acoustic-wave temperature sensors.

Furthermore, the manufacturing method for the surface-acoustic-wave temperature and pressure sensing device further includes: between step (2) and step (3), forming through holes in the first high-temperature-resistant substrate; and filling conductive metals in the through holes, the conductive metals being electrically connected to the first surface-acoustic-wave temperature sensors and the surface-acoustic-wave pressure sensors.

Optionally, the manufacturing method for the surface-acoustic-wave temperature and pressure sensing device further includes: after step (4), forming wires on the second surface for electrically connecting the second surface-acoustic-wave temperature sensors and the conductive metals.

In the surface-acoustic-wave temperature and pressure sensing device and the manufacturing method thereof provided by the present disclosure, the two high-temperature-resistant substrates are bonded to form the sealed cavity therebetween, the first surface-acoustic-wave temperature sensors and the surface-acoustic-wave pressure sensors are arranged in the cavity, the second surface-acoustic-wave temperature sensors are provided outside the cavity, and the three kinds of surface-acoustic-wave devices are electrically connected to one another.

An external pressure can deform the cavity, so that a propagation velocity of a surface acoustic wave on the first high-temperature-resistant substrate is changed, and then the operating frequency of the surface-acoustic-wave pressure sensors is changed. Moreover, the change of ambient temperature can also deform the first high-temperature-resistant substrate, so that the operating frequency of the first surface-acoustic-wave temperature sensors and the operating frequency of the second surface-acoustic-wave temperature sensors are changed.

A temperature measured by the first surface-acoustic-wave temperature sensors located in the cavity is used for performing temperature compensation on a pressure measured by the surface-acoustic-wave pressure sensors also located in the cavity, and the second surface-acoustic-wave temperature sensors located outside the cavity are used for measuring an ambient temperature.

In the structure above, the use of the high-temperature-resistant substrates and the surface-acoustic-wave devices not only significantly increases the operating temperatures of the temperature and pressure sensors to implement the real-time health monitoring for the components in the high-temperature environment, but also can prevent the influence of high temperature on the measurement accuracy of the pressure sensors through temperature compensation. Moreover, the present disclosure has advantages such as simple structure, small volume, and low manufacturing cost.

BRIEF DESCRIPTION OF THE DRAWINGS

To describe the technical solutions in embodiments of the present disclosure or in the prior art more clearly, the accompanying drawings required for describing the embodiments or the prior art are briefly described below. Apparently, the accompanying drawings in the following descriptions show some embodiments of the present disclosure, and a person of ordinary skill in the art may still derive other accompanying drawings from these accompanying drawings without creative efforts.

DETAILED DESCRIPTION OF THE EMBODIMENTS

Figure 1:
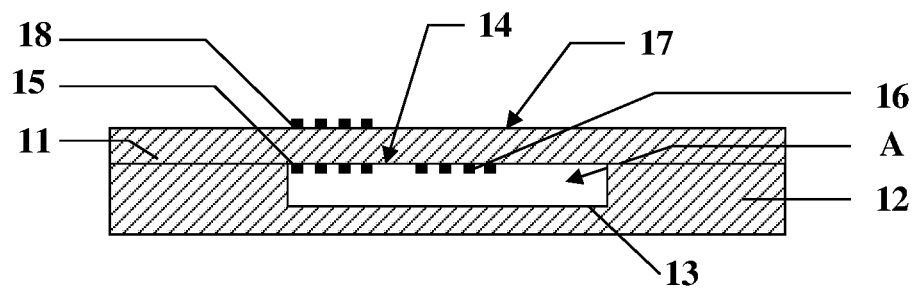
FIG. 1 is a schematic cross-sectional diagram of a surface-acoustic-wave temperature and pressure sensing device provided by an embodiment of the present disclosure.

To make the objectives, technical solutions, and advantages of the present disclosure clearer, the technical solutions in the embodiments of the present disclosure are clearly and completely described below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

To make the technical solutions of the present disclosure clearer, the embodiments of the present disclosure are described in detail below with reference to the accompanying drawings.

An embodiment of the present disclosure provides a surface-acoustic-wave temperature and pressure sensing device. As shown in FIG. 1 to FIG. 4, the surface-acoustic-wave temperature and pressure sensing device includes a first high-temperature-resistant substrate 11 and a second high-temperature-resistant substrate 12 bonded together. A recess 13 is formed in the second high-temperature-resistant substrate 12 so as to form a sealed cavity A between the first high-temperature-resistant substrate 11 and the second high-temperature-resistant substrate 12.

First surface-acoustic-wave temperature sensors 15 and surface-acoustic-wave pressure sensors 16 are formed on a first surface 14 of the first high-temperature-resistant substrate 11 located in the cavity A, and second surface-acoustic-wave temperature sensors 18 are formed on a second surface 17 of the first high-temperature-resistant substrate 11 opposite the first surface 14. The first surface-acoustic-wave temperature sensors 15, the second surface-acoustic-wave temperature sensors 18, and the surface-acoustic-wave pressure sensors 16 are electrically connected to one another.

It should be noted that the bonded first high-temperature-resistant substrate 11 and second high-temperature-resistant substrate 12 are tightly joined as a whole. For convenience of description, FIG. 1 separately shows the structures of the two substrates.

In the surface-acoustic-wave temperature and pressure sensing device provided by the embodiment of the present disclosure, the two high-temperature-resistant substrates are bonded to form the sealed cavity A therebetween. The first surface-acoustic-wave temperature sensors 15 and the surface-acoustic-wave pressure sensors 16 are arranged in the cavity A, the second surface-acoustic-wave temperature sensors 18 are arranged outside the cavity, and the three kinds of surface-acoustic-wave devices are electrically connected to one another.

When the surface-acoustic-wave temperature and pressure sensing device operates, the external pressure can deform the cavity A, so that the propagation velocity of the surface acoustic wave on the first high-temperature-resistant substrate 11 is changed, and then the operating frequency of the surface-acoustic-wave pressure sensors 16 is changed. Moreover, the change of ambient temperature can also deform the first high-temperature-resistant substrate 11, so that the operating frequency of the first surface-acousticwave temperature sensors 15 and the operating frequency of the second surface-acoustic-wave temperature sensors 18 are changed.

Since both the pressure and temperature changes cause the surface of the first high-temperature-resistant substrate 11 to deform, the pressure measured by the surface-acoustic-wave pressure sensors 16 is influenced by the temperature change, resulting in an inaccurate measurement result. Therefore, the first surface-acoustic-wave temperature sensors 15 are arranged in the cavity A, and are enabled to have the same temperature as an environment where the surface-acoustic-wave pressure sensors 16, also located in the cavity A, are located; and the temperature measured by the first surface-acoustic-wave temperature sensors 15 can be used for performing temperature compensation on the pressure measured by the surface-acoustic-wave pressure sensors 16, thereby eliminating an adverse effect of the temperature factor on the pressure measurement result. In addition, the second surface-acoustic-wave temperature sensors 18 located outside the cavity A are configured to measure the ambient temperature.

The surface-acoustic-wave temperature and pressure sensing device is influenced by both temperature and pressure, and the operating frequency of any one of the sensors can be expressed as the following formula.

$$f_r(T,P) = f_r(T_0, P_0) \times [1 + \varphi(T) + \psi(P)]$$

In this formula, $f_r(T, P)$ is an operating frequency when the ambient temperature is T and the applied pressure is P, namely the operating frequency when each sensor operates at temperature T and pressure P; $T_0$ is a room temperature when no temperature is applied; $P_0$ is an atmospheric pressure when no pressure is applied; and $f_r(T_0, P_0)$ is an operating frequency when each sensor operates at temperature $T_0$ and pressure $P_0$, which is a known number. According to the device, $\varphi(T)$ is a frequency drift coefficient caused only by the temperature, and $\psi(P)$ is a frequency drift coefficient caused only by the applied pressure. The formula is modified to obtain the following formula.

$$\psi(P) = \frac{f_r(T, P) - f_r(T_0, P_0)}{f(T_0, P_0)} - \varphi(T)$$

The first surface-acoustic-wave temperature sensors 15 can measure a temperature frequency drift coefficient not influenced by pressure P, thereby obtaining $\varphi(T)$. Then, when at temperature T and pressure P, the surface-acoustic-wave pressure sensors 16 obtain $f_r(T, P)$, which is then substituted into the formula according to known $f_r(T_0, P_0)$ to obtain the frequency drift coefficient $\psi(P)$ caused only by the applied pressure. Finally, a compensated pressure value is obtained. Therefore, the result measured by the surface-acoustic-wave pressure sensors 16 is compensated with the temperature measured by the first surface-acoustic-wave temperature sensors 15.

In the structure above, the use of the high-temperature-resistant substrates and the surface-acoustic-wave devices not only significantly increases the operating temperatures of the temperature and pressure sensors to implement the real-time health monitoring for the components in the high-temperature environment, but also can prevent the influence of high temperature on the measurement accuracy of the pressure sensors through temperature compensation. Moreover, the present disclosure has advantages such as simple structure, small volume, and low manufacturing cost.

In the surface-acoustic-wave temperature and pressure sensing device provided by the embodiment, both the first high-temperature-resistant substrate 11 and the second high-temperature-resistant substrate 12 can be made of gallium lanthanum silicate, which is a multifunctional crystal with excellent performance and has characteristics such as good temperature characteristics, a large electromechanical coupling coefficient, and high-temperature stability; and using gallium lanthanum silicate to manufacture a high-temperature surface-acoustic-wave sensor has unique advantages.

Figure 4:
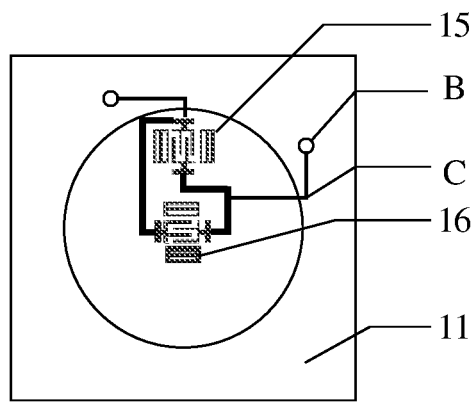
FIG. 4 is a schematic planar diagram of a second surface of the first high-temperature-resistant substrate in the surface-acoustic-wave temperature and pressure sensing device shown in FIG. 1.

In the surface-acoustic-wave temperature and pressure sensing device, as shown in FIG. 4, the surface-acoustic-wave pressure sensors 16 are located in the center of the first surface 14 inside the cavity A, and the first surface-acoustic-wave temperature sensors 15 are located on an edge of the first surface 14 inside the cavity A. From the embodiment above, it can be known that both the pressure and temperature changes cause the surface of the first high-temperature-resistant substrate 11 to deform. Due to the existence of the sealed cavity A, a pressure causes the first high-temperature-resistant substrate 11 close to the center of the cavity A to undergo a relatively larger deformation and the first high-temperature-resistant substrate 11 distant from the center of the cavity A undergo a relatively smaller deformation. Therefore, arranging the first surface-acoustic-wave temperature sensors 15 on the edge of the first surface 14 inside the cavity A can keep the first surface-acoustic-wave temperature sensors 15 distant from the center of the cavity A, thereby minimizing the influence of the pressure on the accuracy of the temperature measurement result.

Figure 3:
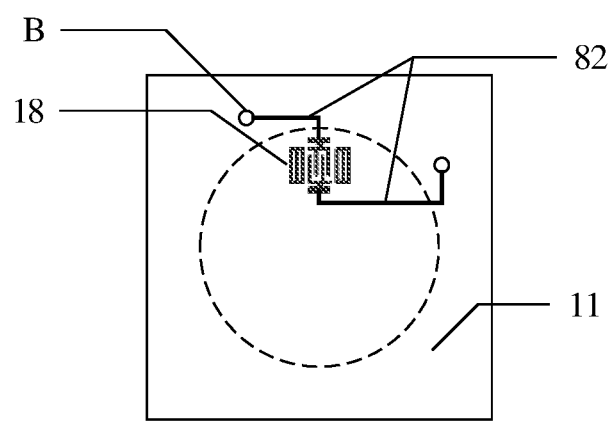
FIG. 3 is a schematic planar diagram of observing from a first surface of a first high-temperature-resistant substrate in the surface-acoustic-wave temperature and pressure sensing device shown in FIG. 1.

Furthermore, as shown in FIG. 3, the second surface-acoustic-wave temperature sensors 18 may be opposite the first surface-acoustic-wave temperature sensors 15. That is, the first surface-acoustic-wave temperature sensors 15 and the second surface-acoustic-wave temperature sensors 18 respectively arranged on the two opposite surfaces of the first high-temperature-resistant substrate 11 are opposite. In this way, when the device is under a pressure, the deformations of positions of the first high-temperature-resistant substrate 11 where the first surface-acoustic-wave temperature sensors 15 and the second surface-acoustic-wave temperature sensors 18 are located are the same. Therefore, the influence on the temperature measurement result from the pressure is the same, and temperature testing cannot be influenced by the pressure change. From the description above, it can be known that when the first surface-acoustic-wave temperature sensors 15 are located on the edge of the first surface 14 inside the cavity A, the influence from the pressure is very small. Therefore, when the second surface-acoustic-wave temperature sensors 18 are opposite the first surface-acoustic-wave temperature sensors 15, the influence from the pressure is also very small.

It should be noted that: to clearly show the position of each sensor, on the first high-temperature-resistant substrate 11 in FIG. 3 and FIG. 4, an outline of the recess 13 on the second high-temperature-resistant substrate 12 bonded to the first high-temperature-resistant substrate 11 is indicated by a dotted line.

In the surface-acoustic-wave temperature and pressure sensing device provided by the embodiment, as shown in FIG. 3 and FIG. 4, the through holes B can be formed in the first high-temperature-resistant substrate 11, and are filled with the conductive metals; the conductive metals may be platinum used for electrically connecting the second surface-acoustic-wave temperature sensors 18 to the first surface-acoustic-wave temperature sensors 15 and the surface-acoustic-wave pressure sensors 16. C in FIG. 4 represents an electrode wire extending from electrodes of two sensors to each through hole B, and can be formed at the same time as the sensors are manufactured. 82 in FIG. 3 represents a wire between each through hole B and an electrode of each second surface-acoustic-wave temperature sensor 18. Of course, the manner for electrically connecting the three kinds of surface-acoustic-wave sensors is not limited to this, and other electrical connection manners known to a person skilled in the art can also be applied to the present disclosure.

The surface-acoustic-wave temperature and pressure sensing device further includes protective layers respectively covering the first surface-acoustic-wave temperature sensors, the second surface-acoustic-wave temperature sensors, and the surface-acoustic-wave pressure sensors. Since exposed interdigital electrodes and reflection gratings of the surface-acoustic-wave sensors are subjected to phenomena such as agglomeration, cracking, and even fracture, depositing the protective layers, such as aluminum nitride films, respectively on the interdigital electrodes and the reflection gratings can prevent these phenomena.

An embodiment of the present disclosure also provides a manufacturing method for the surface-acoustic-wave temperature and pressure sensing device. As shown in FIG. 5 to FIG. 8, the manufacturing method for the surface-acoustic-wave temperature and pressure sensing device includes the following steps.

Step 1, form a recess in a second high-temperature-resistant substrate 12.

Figure 5:
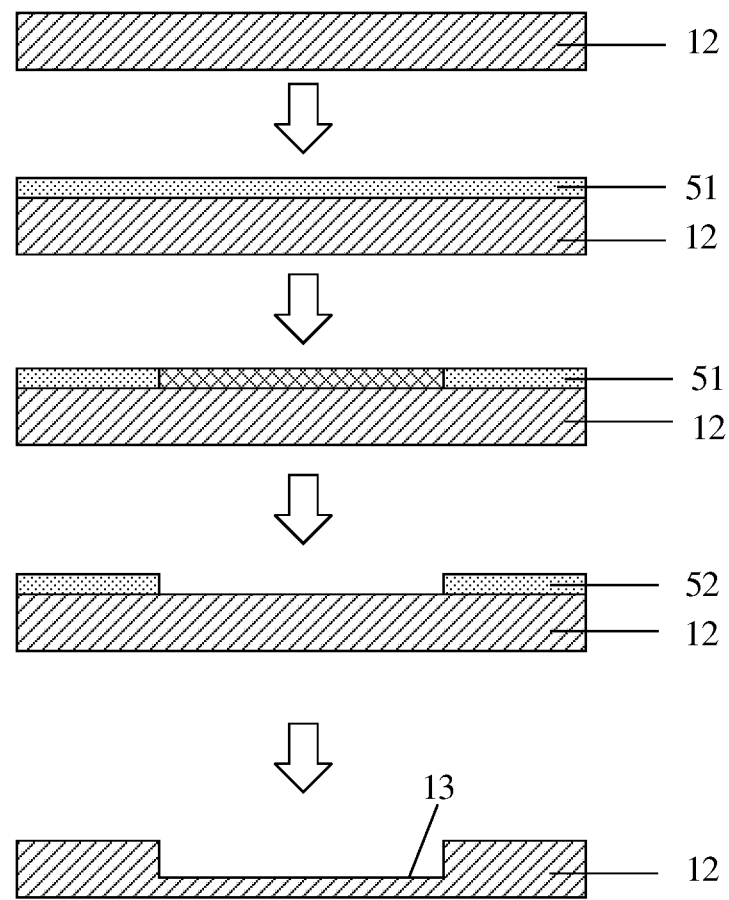
FIG. 5 is a manufacturing flowchart of the second high-temperature-resistant substrate shown in FIG. 2.

This step is as shown in FIG. 5. The second high-temperature-resistant substrate 12 is cleaned first with acetone and then with a cleaning solution which is a mixed solution of isopropyl alcohol, $H_2O_2$ and $H_2SO_4$, and the second high-temperature-resistant substrate is heated for 20 minutes in an environment of 150° C. to remove a residual organic substance on the surface of the second high-temperature-resistant substrate 12.

Figure 2:
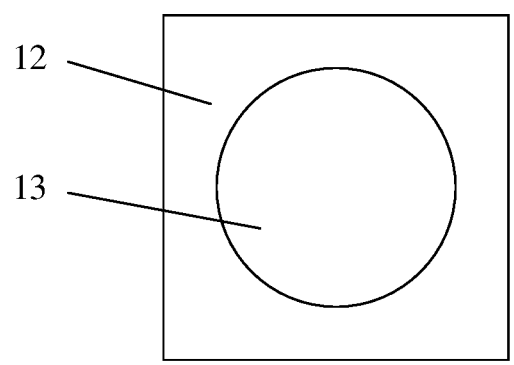
FIG. 2 is a schematic planar diagram of a surface of a second high-temperature-resistant substrate having a recess in the surface-acoustic-wave temperature and pressure sensing device shown in FIG. 1.

Then, an SU-8 photoresist 51 is spin-coated on the surface of the second high-temperature-resistant substrate 12, a mask is placed, photolithography and development are performed to form a photoresist pattern 52, and the photoresist pattern 52 is cleaned with deionized water. A mixed solution of hydrochloric acid and hydrofluoric acid, or a mixed solution of hydrochloric acid and phosphoric acid, or other solutions that can corrode a high-temperature-resistant substrate are then prepared and heated to 80° C.; this mixed solution is used to corrode the second high-temperature-resistant substrate 12 having the photoresist pattern 52, makes the surface of the second high-temperature-resistant substrate 12 smooth, and has a higher etching rate; the structure of the recess 13 as shown in FIG. 2 is obtained after the corrosion for 2.5 h; and finally, the remaining photoresist pattern 52 is removed. The recess 13 may be circular or may be in any other shape known to a person skilled in the art to facilitate pressure measurement.

Step 2, form first surface-acoustic-wave temperature sensors and surface-acoustic-wave pressure sensors on a first surface of a first high-temperature-resistant substrate.

Figure 6:
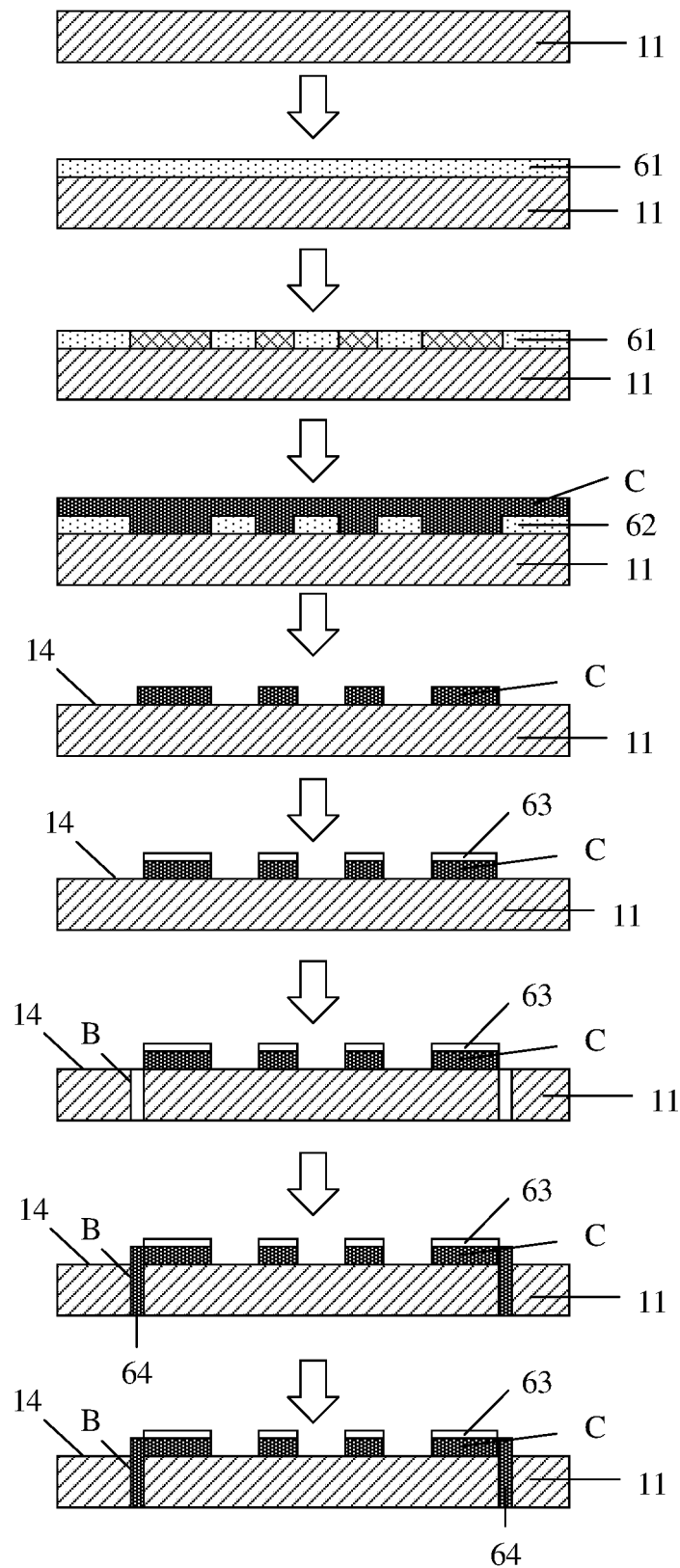
FIG. 6 is a manufacturing flowchart of the first surface structure shown in FIG. 3.

This step is as shown in FIG. 6. First, the first high-temperature-resistant substrate 11 is placed in a sulfuric acid-hydrogen peroxide mixture (a volume ratio of sulfuric acid to hydrogen peroxide is 3:1) for 15 min, then placed in ethanol for ultrasonic cleaning for 5 min, then placed in acetone for ultrasonic cleaning for 5 min, and finally placed in the deionized water for ultrasonic cleaning for 5 min, so as to clean the surface of the first high-temperature-resistant substrate 11, and thus the organic substance (such as grease) adhered to the surface of a piezoelectric substrate can be effectively removed, and the adhesion of metals in subsequent metal sputtering is enhanced.

Next, a photoresist 61 is coated on a first surface 14 of the first high-temperature-resistant substrate 11, a mask having an electrode pattern is coated on the surface of the photoresist 61 and exposed to ultraviolet light, and the exposed photoresist 61 is developed to form a photoresist pattern 62 having a mask pattern window.

Finally, a pattern of a conductive material C is formed on the first surface of the first high-temperature-resistant substrate 11 by magnetron sputtering, thereby forming the first surface-acoustic-wave temperature sensors 15 and the surface-acoustic-wave pressure sensors 16 shown in FIG. 1. The conductive material may be platinum.

This step may further include: forming protective layers 63 respectively on the first surface-acoustic-wave temperature sensors 15 and the surface-acoustic-wave pressure sensors 16. Specifically, a pulsed laser deposition method can be used to plate an MN thin film of 200 nm on the surface of each of structures made of a metal material, such as interdigital electrodes and reflection gratings of two sensors, so as to prevent such structures as the interdigital electrodes and the reflection gratings from being subjected to phenomena such as agglomeration, cracking, and even fracture. The interdigital electrodes and the reflection gratings can be manufactured from platinum.

The following steps can also be performed after this step: forming through holes B in the first high-temperature-resistant substrate 11; and filling conductive metals 64 in the through holes, the conductive metals 64 being electrically connected to the first surface-acoustic-wave temperature sensors 15 and the surface-acoustic-wave pressure sensors 16.

Specifically, a laser drilling device can be used to drill two through holes B, having a diameter of 1 mm and a height equal to the thickness of the first high-temperature-resistant substrate 11, at two electrodes of the first high-temperature-resistant substrate where the first surface-acoustic-wave temperature sensors 15 and the surface-acoustic-wave pressure sensors 16 are manufactured; and a conductive metal paste is poured into the through holes B and sintered at 1000° C. to form the conductive metals 64. The conductive metals 64 may be made of a platinum paste.

It should be noted that when the protective layers 63 need to be formed respectively on the first surface-acoustic-wave temperature sensors 15 and the surface-acoustic-wave pressure sensors 16, the step of forming through holes can be performed after the step of forming protective layers 63. In addition, when the first surface-acoustic-wave temperature sensors 15 and the surface-acoustic-wave pressure sensors 16 are formed, positive and negative electrodes of the two sensors can be respectively connected to one another as shown in FIG. 3. Moreover, the connected positive electrodes and the connected negative electrodes extend to positions where the through holes B need to be manufactured, and these extending electrode wires can also be formed simultaneously with the first surface-acoustic-wave temperature sensors 15 and the surface-acoustic-wave pressure sensors 16. After the through holes B are manufactured and filled with the conductive metals 63, the conductive metals 63 can be electrically connected to the first surface-acoustic-wave temperature sensors 15 and the surface-acoustic-wave pressure sensors 16.

Step 3, bond the first high-temperature-resistant substrate 11 and the second high-temperature-resistant substrate 12 so as to form a sealed cavity A therebetween, where the first surface-acoustic-wave temperature sensors 15 and the surface-acoustic-wave pressure sensors 16 are located in the sealed cavity A.

Figure 7:
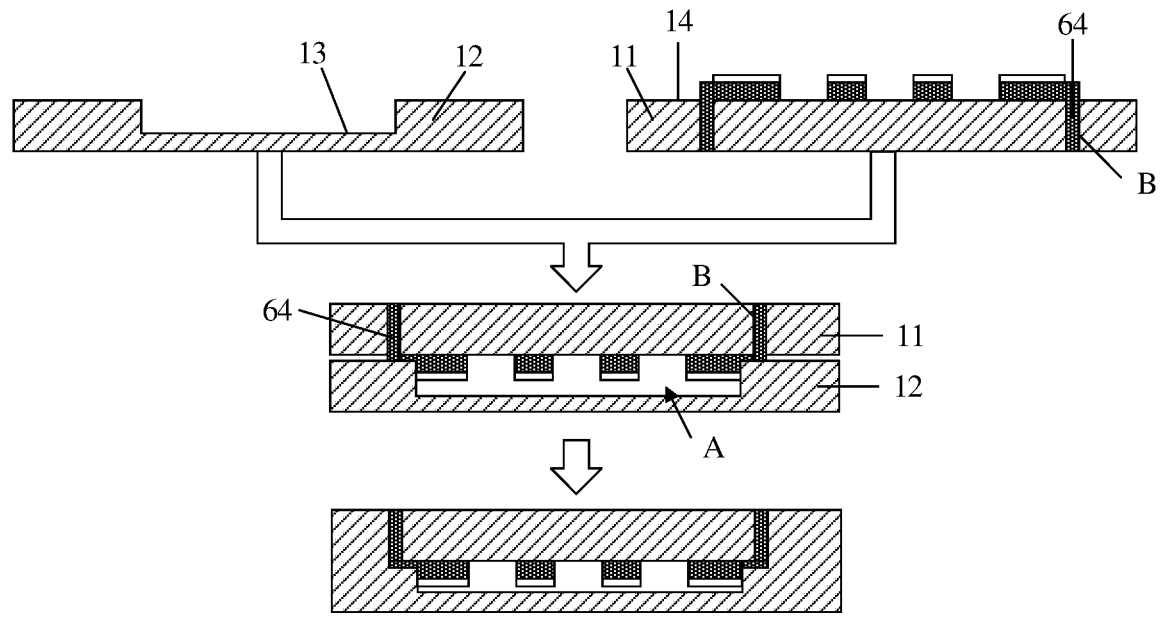
FIG. 7 is a bonding flowchart of the second high-temperature-resistant substrate shown in FIG. 2 and the first high-temperature-resistant substrate formed according to the process shown in FIG. 3.

This step is as shown in FIG. 7. The second high-temperature-resistant substrate 12 having the recess 13 and the first high-temperature-resistant substrate 11 having the first surface-acoustic-wave temperature sensors 15 and the surface-acoustic-wave pressure sensors 16 are subjected to thermal compression bonding to form a structure having the sealed cavity A.

Before the bonding, the two high-temperature-resistant substrates to be bonded are first subjected to a surface polishing process to reduce the surface roughness thereof and then subjected to hydrophilic surface treatment, including wet cleaning and plasma treatment. The two substrates are wet-cleaned sequentially with acetone, alcohol, a sulfuric acid-hydrogen peroxide mixture (SPM), a standard cleaning solution No. 1 (SC1), a diluted hydrofluoric acid solution, and deionized water. Then, the two substrates are surface-treated with an oxygen plasma to obtain dangling bond hydrophilic OH-groups on the surfaces of the substrates, thereby changing a chemical state of a wafer surface and increasing the activation energy of the wafer surface.

After the surface treatment, the surface of the second high-temperature-resistant substrate 12 having the recess 13 and the surface of the first high-temperature-resistant substrate 11 having the sensors are directly pre-bonded, the pre-bonded structure is fixed in a graphite mold, then loaded in a sleeve, and fixed and placed in a high-temperature pressure furnace, and the upper and lower surfaces of the pre-bonded structure in the vertical direction are pressurized and heated simultaneously to implement permanent bonding of the structure, thereby obtaining the sealed cavity A.

Step 4, form second surface-acoustic-wave temperature sensors 18 on a second surface 17 of the first high-temperature-resistant substrate 11 opposite the first surface 14.

Figure 8:
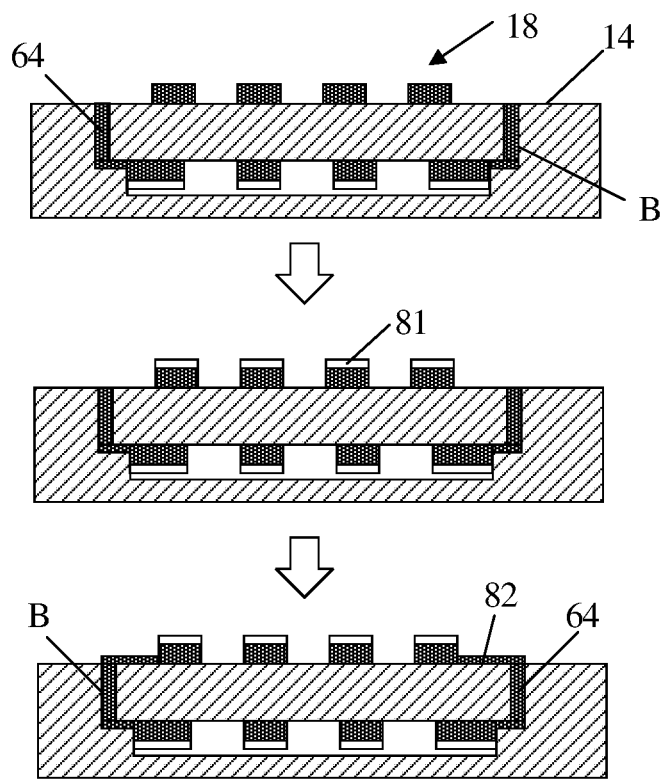
FIG. 8 is a flowchart of forming second surface-acoustic-wave temperature sensors on the structure shown in FIG. 7.

This step is as shown in FIG. 8. The cleaning method in step 2 can be used to clean the structure formed by bonding in step 3, then the photoresist in step 2 can be coated and exposed to form the photoresist pattern, and such methods as sputtering can be used to form the second surface-acoustic-wave temperature sensors 18 on the second surface 17.

Step (4) may further include: forming protective layers 81 respectively on the second surface-acoustic-wave temperature sensors 18. Specifically, the pulsed laser deposition method can be used to plate an AlN thin film of 200 nm on the surface of each of structures made of a metal material, such as interdigital electrodes and reflection gratings of the second surface-acoustic-wave temperature sensors 18, so as to prevent such structures as the interdigital electrodes and the reflection gratings from being subjected to phenomena such as agglomeration, cracking, and even fracture. The interdigital electrodes and the reflection gratings can be manufactured from platinum.

The following step may also be performed after step (4): forming wires 82 on the second surface 17 for electrically connecting the second surface-acoustic-wave temperature sensors 18 and the conductive metals 64. The wires 82 may be made of platinum.

It should be noted that: when the protective layers 81 need to be formed respectively on the second surface-acoustic-wave temperature sensors 18, this operation can be performed after the step of forming wires 82, so that the wires 82 and the interdigital electrodes and the reflection gratings of the second surface-acoustic-wave temperature sensors 18 are simultaneously protected. The wires 82 shown in FIG. 8 are formed after the formation of the protective layers 81.

In addition, in the structures formed by the steps respectively shown in FIG. 6 to FIG. 8, the first surface-acoustic-wave temperature sensors 15 and the surface-acoustic-wave pressure sensors 16 are schematically represented by four protrusions on the first surface 14 of the first high-temperature-resistant substrate 11, which do not refer to a specific part of a certain sensor. Similarly, the second surface-acoustic-wave temperature sensors 18 are also schematically represented by four protrusions on the second surface 17 of the first high-temperature-resistant substrate 11, which do not refer to a specific part of this sensor.

In the manufacturing method for the surface-acoustic-wave temperature and pressure sensing device provided by the embodiment of the present disclosure, the two high-temperature-resistant substrates are bonded to form the sealed cavity therebetween, the first surface-acoustic-wave temperature sensors and the surface-acoustic-wave pressure sensors are arranged in the cavity, the second surface-acoustic-wave temperature sensors are arranged outside the cavity, and the three kinds of surface-acoustic-wave devices are electrically connected to one another.

The external pressure can deform the cavity, so that the propagation velocity of the surface acoustic wave on the first high-temperature-resistant substrate is changed, and then the operating frequency of the surface-acoustic-wave pressure sensors is changed. Moreover, the change of ambient temperature can also deform the first high-temperature-resistant substrate, so that the operating frequency of the first surface-acoustic-wave temperature sensors and the operating frequency of the second surface-acoustic-wave temperature sensors are changed.

The temperature measured by the first surface-acoustic-wave temperature sensors located in the cavity is used for performing temperature compensation on the pressure measured by the surface-acoustic-wave pressure sensors also located in the cavity, and the second surface-acoustic-wave temperature sensors located outside the cavity are used for measuring the ambient temperature.

In the structure above, the use of the high-temperature-resistant substrates and the surface-acoustic-wave devices not only significantly increases the operating temperatures of the temperature and pressure sensors to implement the real-time health monitoring for the components in the high-temperature environment, but also can prevent the influence of high temperature on the measurement accuracy of the pressure sensors through temperature compensation. Moreover, the present disclosure has advantages such as simple structure, small volume, simple manufacturing steps and low cost.

Finally, it should be noted that the above embodiments are merely intended to describe the technical solutions of the present disclosure, rather than to limit the present disclosure. Although the present disclosure is described in detail with reference to the above embodiments, a person of ordinary skill in the art should understand that they may still make modifications to the technical solutions described in the above embodiments or make equivalent replacements to some technical features thereof, without departing from the essence of the technical solutions in the embodiments of the present disclosure.

What is claimed is:

1. A surface-acoustic-wave temperature and pressure sensing device, comprising:
   a first high-temperature-resistant substrate; and
   a second high-temperature-resistant substrate bonded to the first high-temperature-resistant substrate, wherein a recess is formed in the second high-temperature-resistant substrate to form a sealed cavity between the first high-temperature-resistant substrate and the second high-temperature-resistant substrate;

first surface-acoustic-wave temperature sensors and surface-acoustic-wave pressure sensors are formed on a first surface of the first high-temperature-resistant substrate located in the cavity, and second surface-acoustic-wave temperature sensors are formed on a second surface of the first high-temperature-resistant substrate opposite the first surface; and wherein the first surface-acoustic-wave temperature sensors, the second surface-acoustic-wave temperature sensors, and the surface-acoustic-wave pressure sensors are electrically connected to one another;

wherein the surface-acoustic-wave pressure sensors are located in a center of the first surface inside the cavity, and the first surface-acoustic-wave temperature sensors are located on an edge of the first surface inside the cavity;

wherein the second surface-acoustic-wave temperature sensors are opposite to the first surface-acoustic-wave temperature sensors.

2. The surface-acoustic-wave temperature and pressure sensing device according to claim 1, wherein both the first high-temperature-resistant substrate and the second high-temperature-resistant substrate are made of lanthanum gallium silicate.

3. The surface-acoustic-wave temperature and pressure sensing device according to claim 1, wherein through holes are formed in the first high-temperature-resistant substrate and filled with conductive metals for electrically connecting the second surface-acoustic-wave temperature sensors to the first surface-acoustic-wave temperature sensors and the surface-acoustic-wave pressure sensors.

4. The surface-acoustic-wave temperature and pressure sensing device according to claim 1, further comprising protective layers respectively covering the first surface-acoustic-wave temperature sensors, the second surface-acoustic-wave temperature sensors, and the surface-acoustic-wave pressure sensors.

5. A manufacturing method for a surface-acoustic-wave temperature and pressure sensing device, the manufacturing method comprising:

(1) forming a recess in a second high-temperature-resistant substrate;

(2) forming first surface-acoustic-wave temperature sensors and surface-acoustic-wave pressure sensors on a first surface of a first high-temperature-resistant substrate;

(3) bonding the first high-temperature-resistant substrate and the second high-temperature-resistant substrate to form a sealed cavity therebetween, the first surface-acoustic-wave temperature sensors and the surface-acoustic-wave pressure sensors being located in the sealed cavity; and (4) forming second surface-acoustic-wave temperature sensors on a second surface of the first high-temperature-resistant substrate opposite the first surface;

wherein the surface-acoustic-wave pressure sensors are located in a center of the first surface inside the cavity, and the first surface-acoustic-wave temperature sensors are located on an edge of the first surface inside the cavity;

wherein the second surface-acoustic-wave temperature sensors are opposite to the first surface-acoustic-wave temperature sensors.

6. The manufacturing method according to claim 5, wherein step (2) further comprises: forming protective layers respectively on the first surface-acoustic-wave temperature sensors and the surface-acoustic-wave pressure sensors.

7. The manufacturing method according to claim 5, wherein step (4) further comprises: forming protective layers respectively on the second surface-acoustic-wave temperature sensors.

8. The manufacturing method according to claim 5, further comprising: between step (2) and step (3), forming through holes in the first high-temperature-resistant substrate; and filling conductive metals in the through holes, the conductive metals being electrically connected to the first surface-acoustic-wave temperature sensors and the surface-acoustic-wave pressure sensors.

9. The manufacturing method according to claim 6, further comprising: between step (2) and step (3), forming through holes in the first high-temperature-resistant substrate; and filling conductive metals in the through holes, the conductive metals being electrically connected to the first surface-acoustic-wave temperature sensors and the surface-acoustic-wave pressure sensors.

10. The manufacturing method according to claim 7, further comprising: between step (2) and step (3), forming through holes in the first high-temperature-resistant substrate; and filling conductive metals in the through holes, the conductive metals being electrically connected to the first surface-acoustic-wave temperature sensors and the surface-acoustic-wave pressure sensors.

11. The manufacturing method according to claim 8, further comprising: after step (4), forming wires on the second surface for electrically connecting the second surface-acoustic-wave temperature sensors and the conductive metals.

12. The manufacturing method according to claim 9, further comprising: after step (4), forming wires on the second surface for electrically connecting the second surface-acoustic-wave temperature sensors and the conductive metals.

13. The manufacturing method according to claim 10, further comprising: after step (4), forming wires on the second surface for electrically connecting the second surface-acoustic-wave temperature sensors and the conductive metals.

* * * * *